United States Patent
Yu

(10) Patent No.: US 8,498,679 B2
(45) Date of Patent: Jul. 30, 2013

(54) ELECTRONIC DEVICE WITH BLUETOOTH EARPHONE

(75) Inventor: Qi Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 344 days.

(21) Appl. No.: 12/972,536

(22) Filed: Dec. 20, 2010

(65) Prior Publication Data

US 2012/0064831 A1 Mar. 15, 2012

(30) Foreign Application Priority Data

Sep. 13, 2010 (CN) .......................... 2010 1 0279624

(51) Int. Cl.
*H04M 1/00* (2006.01)
(52) U.S. Cl.
USPC .............. 455/575.2; 455/41.2; 455/575.1; 455/575.6; 455/569.1; 455/550.1; 381/388; 381/381; 379/430; 379/431
(58) Field of Classification Search
USPC ............ 455/41.2, 575.1, 575.6, 569.1, 569.2, 455/550.1, 575.2; 381/388, 381; 379/430, 379/431
See application file for complete search history.

(56) References Cited

U.S. PATENT DOCUMENTS

| | | | |
|---|---|---|---|
| 8,095,188 B2 * | 1/2012 | Shi | 455/569.1 |
| 8,204,549 B2 * | 6/2012 | Kim et al. | 455/569.2 |
| 2004/0185919 A1 * | 9/2004 | Yoo | 455/575.1 |
| 2007/0025581 A1 * | 2/2007 | Bradford et al. | 381/388 |
| 2007/0042821 A1 * | 2/2007 | Lee et al. | 455/575.6 |

FOREIGN PATENT DOCUMENTS

| | | |
|---|---|---|
| CN | 2874941 Y | 2/2007 |
| CN | 201066844 Y | 5/2008 |
| CN | 101277131 A | 10/2008 |
| CN | 201341161 Y | 11/2009 |
| CN | 101702111 A | 5/2010 |
| TW | M317724 U | 8/2007 |
| TW | 200803574 | 1/2008 |
| TW | M325400 U | 1/2008 |

* cited by examiner

*Primary Examiner* — April G Gonzales
(74) *Attorney, Agent, or Firm* — Altis Law Group, Inc.

(57) ABSTRACT

An electronic device includes a main body and a BLUETOOTH earphone that can be detachably attached to the main body. The earphone includes a keyboard capable of generating signals to control the electronic device in response to user input. The main body includes a detecting unit, a processing unit, and a touch-sensitive screen. The detecting unit generates a signal when the earphone is attached to the main body. The processing unit controls to display information without specific information or with specific information on the touch-sensitive screen upon receiving the signal from the detecting unit.

8 Claims, 3 Drawing Sheets

ELECTRONIC DEVICE WITH BLUETOOTH EARPHONE

BACKGROUND

1. Technical Field

The present disclosure relates to electronic devices and, particularly, to an electronic device having a BLUETOOTH earphone.

2. Description of Related Art

Because BLUETOOTH earphones are small and not usually physically connected to a portable electronic device, they can be easily lost. Furthermore, only a limited number of functions can be performed using conventional BLUETOOTH earphones.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
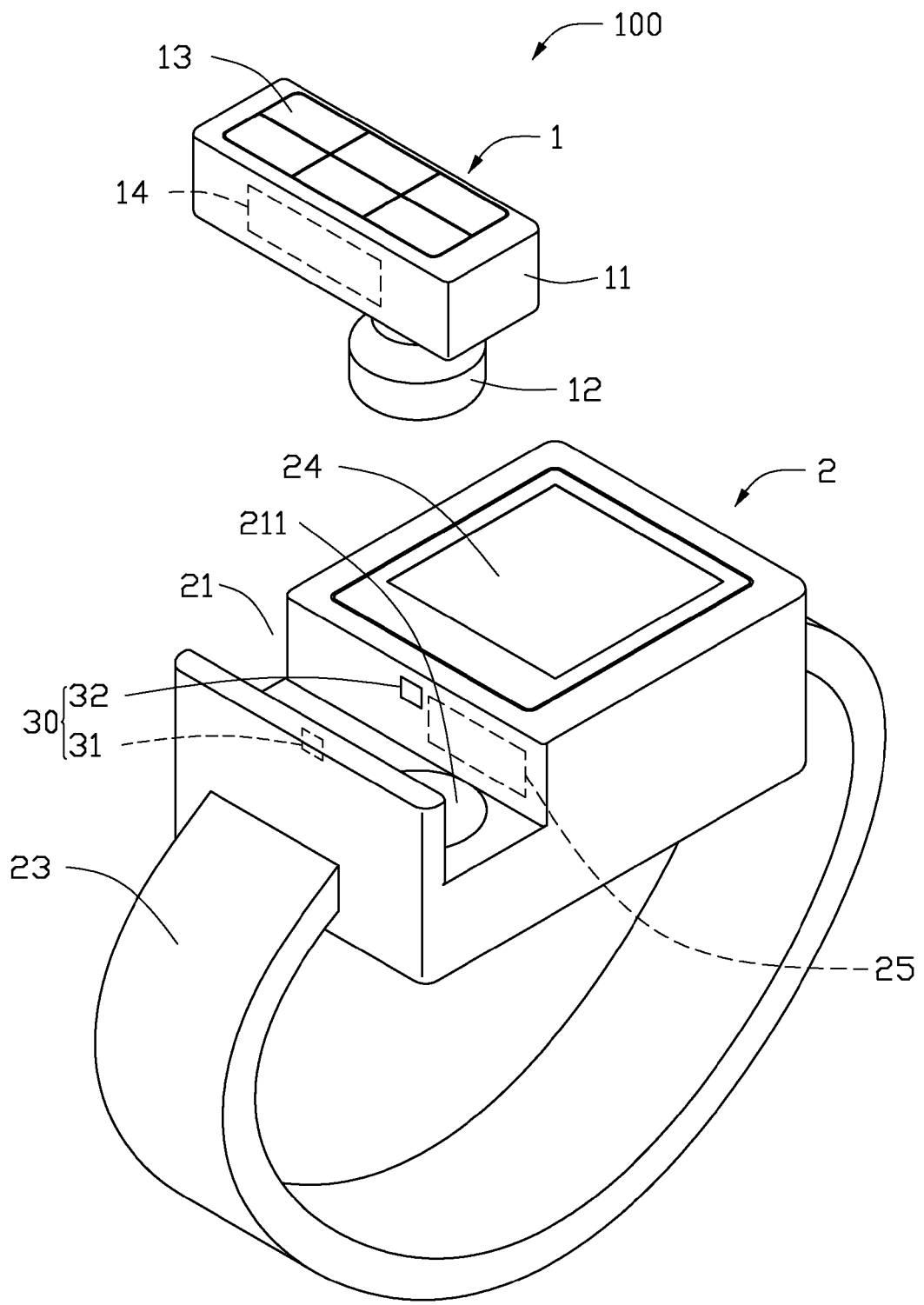
FIG. 1 is an isometric view of an electronic device with a BLUETOOTH earphone in accordance with an exemplary embodiment, showing the BLUETOOTH earphone and a main body of the electronic device.
Figure 2:
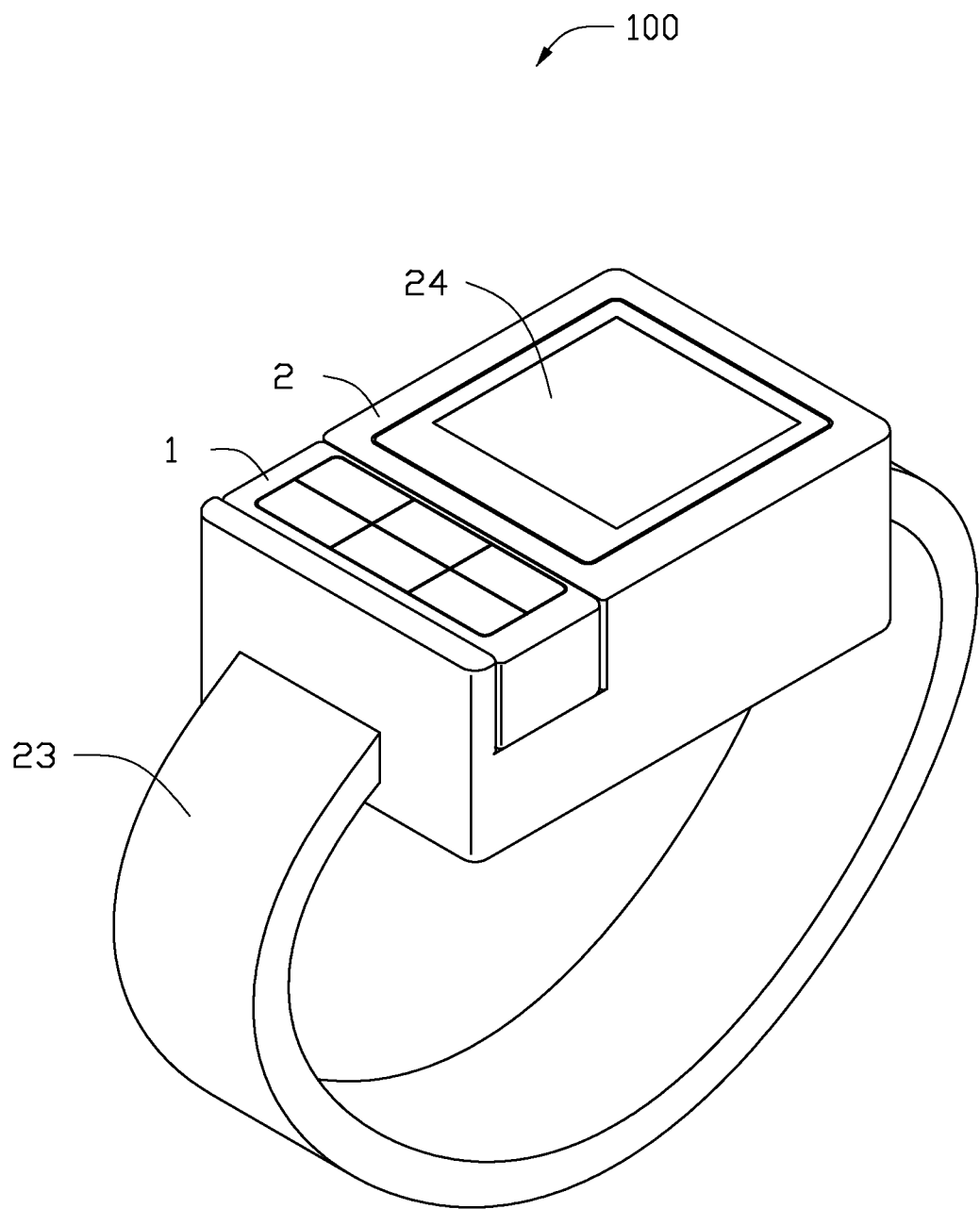
FIG. 2 is an isometric view of the electronic device of FIG. 1, showing the BLUETOOTH earphone attached to the main body of the electronic device.
Figure 3:
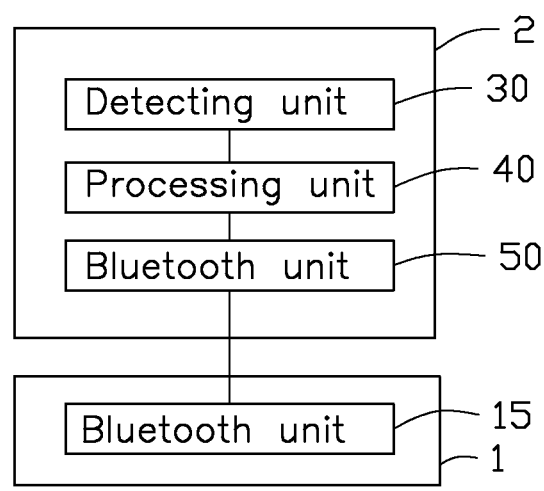
FIG. 3 is a block diagram of the electronic device of FIG. 1.

Referring to FIGS. 1-3, an electronic device 100 includes a BLUETOOTH earphone 1 and a main body 2. The earphone 1 can be detachably attached to the main body 2. The earphone 1 includes a keyboard 13 employed to generate signals to control the electronic device 100 in response to user input.

The earphone 1 further includes a housing 11 and an earplug 12. In this embodiment, at least a portion of the housing 11 is made of magnetic material. In an alternative embodiment, a magnet 14 is mounted within the earphone 1. The keyboard 13 is set on the housing 11 opposite to the earplug 12. The earphone 1 further includes a BLUETOOTH unit 15 to communicate with the main body 2.

The main body 2 defines a receiving space 21 to receive the housing 11. The bottom of the receiving space 21 defines a recessed portion 211 to receive the earplug 12. A magnet 25 is mounted within a sidewall of the receiving space 21. When the earphone 1 is placed into the receiving space 21, causing the earplug 12 to be received in the recessed portion 211, the magnet 25 attracts the housing 11 to secure the earphone 1 to the main body 11. In an alternative embodiment, the magnet 25 attracts the magnet 14 to secure the earphone 1 to the main body 11.

The main body 2 further includes a touch-sensitive screen 24, a detecting unit 30, a processing unit 40, and a BLUETOOTH unit 50 communicating with the BLUETOOTH unit 15 of the earphone 1. The detecting unit 30 generates a signal when the earphone 1 is attached to the main body 2. In this embodiment, the detecting unit 30 includes an infrared emitter 31 and an infrared receiver 32 respectively arranged in opposite sidewalls of the receiving space 21. When the earphone 1 is received in the receiving space 21, that is, when the earphone 1 is attached to the main body 2, the infrared ray from the emitter 31 is blocked by the earphone 1, thus the receiver 32 does not receive the infrared ray. If the receiver 32 does not receive the infrared ray, the receiver 32 generates the signal. In an alternative embodiment, the detecting unit 30 is a pressure sensor mounted in the main body 2. When the earphone 1 is attached to the main body 2, the pressure sensor generates the signal.

The touch-sensitive screen 24 displays visual information. If the processing unit 40 does not receive the signal from the detecting unit 30, the processing unit 40 determines that the earphone 1 is separated from the main body 2, and displays information with specific information, such as touch icons, on the screen 24, thus users can touch the displayed icons to operate the electronic device 100. When the processing unit receives the signal from the detecting unit 30, the processing unit 30 determines that the earphone 1 is attached to the main body 2, and controls not to display the specific information on the screen 24, and the users can employ the keyboard 13 to operate the device 100. By doing so, when the earphone 1 is attached to the main body 2, the processing unit 30 can display more content on the screen 24. In an alternative embodiment, when the earphone 1 is attached to the main body 2, the processing unit 40 controls to display at least one specific information on the screen 24, such as a dialing icon.

In this embodiment, the electronic device 100 further includes a strap 23 connected to the main body 2. The electronic device 100 may be a wearable mobile phone, a wristwatch, or a media player.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   a main body and an earphone detachably attached to the main body, the earphone comprising a keyboard, the main body comprising:
   a touch-sensitive screen;
   a detecting unit configured to generate a signal when the earphone is attached to the main body; and
   a processing unit configured to control specific information to be displayed on the touch-sensitive screen if not receiving the signal from the detecting unit, allowing a user to operate the electronic device via a touch on the specific information; and the processing unit being further configured to control the specific information not to be displayed on the touch-sensitive screen if receiving the signal from the detecting unit, and allowing the user to operate the electronic device via the keyboard instead of the touch on the specific information.

2. The electronic device according to claim 1, wherein the detecting unit comprises an infrared emitter and infrared receiver, when the earphone is attached to the main body, the infrared receiver does not receive the infrared ray from the infrared emitter, if the infrared receiver does not receive the infrared ray from the infrared emitter, the infrared receiver generates the signal.

3. The electronic device according to claim 1, wherein the detecting unit is a pressure sensor, when the earphone is attached to the main body, the pressure sensor generates the signal.

4. The electronic device according to claim 1, wherein the main body comprises a magnetic member, at least a portion of the housing is made of magnetic material, the magnetic member is capable of attracting the housing to attach the earphone to the main body.

5. The electronic device according to claim 1, wherein the main body comprises a first magnetic member, the earphone comprises a second magnetic member, the first magnetic member is capable of attracting the second magnetic member to attach the earphone to the main body.

6. The electronic device according to claim 1, wherein the earphone further comprises a housing and a earplug, and the main body further defines a receiving space to receive the housing, a bottom of the receiving space defines a recessed portion to receive the earplug.

7. The electronic device according to claim 1, further comprising a strap connected to the main body.

8. The electronic device as described in claim 1, wherein the electronic device is a wristwatch.

* * * * *